US011862391B2

(12) United States Patent
Handmer

(10) Patent No.: US 11,862,391 B2
(45) Date of Patent: Jan. 2, 2024

(54) ASYMMETRICAL MAGNET ARRAYS

(71) Applicant: HYPERLOOP TECHNOLOGIES, INC., Los Angeles, CA (US)

(72) Inventor: Casey Handmer, S Pasadena, CA (US)

(73) Assignee: HYPERLOOP TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 18/095,752

(22) Filed: Jan. 11, 2023

(65) Prior Publication Data

US 2023/0170121 A1 Jun. 1, 2023

Related U.S. Application Data

(63) Continuation of application No. 17/537,965, filed on Nov. 30, 2021, now Pat. No. 11,574,755, which is a continuation of application No. 16/986,941, filed on Aug. 6, 2020, now Pat. No. 11,217,374, which is a continuation of application No. 15/675,034, filed on Aug. 11, 2017, now Pat. No. 10,777,344.

(60) Provisional application No. 62/374,297, filed on Aug. 12, 2016.

(51) Int. Cl.
*H01F 7/02* (2006.01)
*H01F 1/00* (2006.01)
*H01F 7/04* (2006.01)

(52) U.S. Cl.
CPC ........... *H01F 7/021* (2013.01); *H01F 1/0036* (2013.01); *H01F 7/04* (2013.01)

(58) Field of Classification Search
CPC ........... H01F 7/04; H01F 1/0036; H01F 7/021
See application file for complete search history.

(56) References Cited

U.S. PATENT DOCUMENTS 6,633,217 B2 * 10/2003 Post ...................... H01F 7/0236 104/282
7,265,470 B1 9/2007 Paden et al.
8,917,154 B2 * 12/2014 Fullerton .............. H01F 7/0278 335/297
9,359,991 B2 * 6/2016 Davey ...................... H02K 7/09
9,718,630 B2 8/2017 Bambrogan et al.
2008/0083346 A1 4/2008 Fiske et al.
2009/0250575 A1 * 10/2009 Fullerton .................. G09F 7/04 248/206.5
2009/0251256 A1 10/2009 Fullerton et al.
2009/0278642 A1 * 11/2009 Fullerton .................. H01F 7/02 335/284

(Continued)

*Primary Examiner* — Mohamad A Musleh
(74) *Attorney, Agent, or Firm* — Seyfarth Shaw LLP

(57) ABSTRACT

Magnet array structure includes a first linear magnet array and a second linear magnet array having a first and a second arrangement of magnets, respectively, in which the first and the second arrangement of magnets are repeated along respective lengths of the first and second linear magnet array. The first and second arrangement of magnets include respective individual first and second magnet elements arranged along the respective length of the first and second linear magnet array so that no net magnetic forces parallel to the length of the first and second linear magnet array result on the first and second arrangement of magnets, respectively. The first arrangement of magnets is offset from the second arrangement of magnets so that the first arrangement of magnets and the second arrangement of magnets partially overlap.

20 Claims, 3 Drawing Sheets

(56) References Cited

U.S. PATENT DOCUMENTS

| | | | | |
|---|---|---|---|---|
| 2010/0031846 | A1 | 2/2010 | Löser et al. | |
| 2010/0181858 | A1 | 7/2010 | Hibbs et al. | |
| 2011/0074331 | A1 | 3/2011 | Fitzgibbon | |
| 2012/0068942 | A1* | 3/2012 | Lauder | H01F 7/0205 361/679.01 |
| 2012/0256715 | A1* | 10/2012 | Fullerton | H01F 7/02 335/285 |
| 2013/0043752 | A1 | 2/2013 | Sankar | |
| 2014/0145809 | A1* | 5/2014 | Roberts | B42F 1/00 335/306 |
| 2016/0033970 | A1 | 2/2016 | Henderson et al. | |
| 2016/0212546 | A1 | 7/2016 | Salvatti | |
| 2016/0229418 | A1 | 8/2016 | Bambrogan et al. | |
| 2016/0284497 | A1* | 9/2016 | Stryker | G06F 1/1679 |
| 2017/0093215 | A1* | 3/2017 | Ng | H02J 50/10 |
| 2017/0275827 | A1 | 3/2017 | Handmer et al. | |
| 2018/0047490 | A1* | 2/2018 | Handmer | H01F 7/021 |

* cited by examiner

ASYMMETRICAL MAGNET ARRAYS

CROSS-REFERENCE TO RELATED APPLICATION

This application is a Continuation of U.S. patent application Ser. No. 17/537,965, filed Nov. 30, 2021, which is a Continuation of U.S. patent application Ser. No. 16/986,941, filed Aug. 6, 2020, now U.S. Pat. No. 11,217,374, which is a Continuation of U.S. patent application Ser. No. 15/675,034, filed Aug. 11, 2017, now U.S. Pat. No. 10,777,344, and claims the benefit under 35 U.S.C. § 119(e) of U.S. Provisional Patent Application No. 62/374,297, filed Aug. 12, 2016. The disclosures of the above-mentioned documents are expressly incorporated by reference herein in their entireties.

BACKGROUND OF THE DISCLOSURE

1. Field of the Disclosure

Embodiments are directed to an arrangement of magnets in opposing magnet arrays.

2. Discussion of Background Information

Traditional systems that need strong magnetic fields in a defined gap, such as certain MRI imagers and motors, use parallel arrays of magnets to create the strong magnetic fields. Such parallel arrays typically generate an attractive force that greatly increases as the gap between the arrays is closed. Typical solutions to overcome this force use a very strong and heavy cantilever to oppose the attractive force. Such solutions, however, greatly increase the weight of the system.

SUMMARY OF THE EMBODIMENTS OF THE DISCLOSURE

Embodiments of the present disclosure are directed to a magnet array structure (MAS) comprising a plurality of opposing magnetic arrays. By alternating width and/or orientation of magnets within the MAS, attractive forces between the opposing magnetic arrays are transformed into shear forces. By alternating sections of positive and negative shear, for example, substantially all forces can be reacted out locally in a singular composite magnet rather than in the supporting structure.

However, there are additional ways of accomplishing this same task. For instance, the opposing magnetic arrays could be subtly different and still cancel out most forces. For example, instead of using arrays comprising a regular 45 degree clocking of the magnetization direction, the magnets could be all equal sizes with carefully chosen magnetization directions. Or the magnets could all be different sizes and different magnetization directions and no periodicity, but still generate strong alternating fields without substantial forces.

Embodiments of the present disclosure may be used in a transportation system, for example, as described in commonly-assigned application Ser. No. 15/007,783, titled "Transportation System," the contents of which are hereby expressly incorporated by reference herein in their entireties.

The novel features which are characteristic of the disclosure, both as to structure and method of operation thereof, together with further aims and advantages thereof, will be understood from the following description, considered in connection with the accompanying drawings, in which preferred embodiments of the disclosure are illustrated by way of example. It is to be expressly understood, however, that the drawings are for the purpose of illustration and description only, and they are not intended as a definition of the limits of the disclosure.

Embodiments of the invention are directed to a magnet array structure that includes a first magnet array including a first repeatable magnet arrangement and second magnet array including a second repeatable magnet arrangement. The first repeatable magnet arrangement includes a plurality of non-uniformly dimensioned magnetic elements and the second repeatable magnet arrangement includes a plurality of non-uniformly dimensioned magnetic elements. The first repeatable magnet arrangement is offset from the second repeatable magnet arrangement to limit attraction forces between the first and second magnet arrays while retaining a desired strong magnetic field.

According to embodiments, the first and second magnet arrays may be parallelly arranged. Further, the first and second magnet arrays can be linear arrays. Alternatively, the first and second magnet arrays can be circular.

In accordance with other embodiments, the non-uniformly dimensioned magnetic elements of the first repeatable magnet arrangement can include a first plurality of magnetic elements having a plurality of at least one of widths and heights and a plurality of magnetic flux orientations, and the non-uniformly dimensioned magnetic elements of the second repeatable magnet arrangement can include a second plurality of magnetic elements having a plurality of at least one of widths and heights and a plurality of magnetic flux orientations. The first plurality of magnetic elements may have a plurality of at least one of widths and heights include at least one first magnetic element with at least one of a first width and first height, at least one second magnetic element with at least one of a second width and second height that is a multiple of that of the at least one first magnetic element, and at least one third magnetic element with at least one of a third width and third height that is a multiple of that of the at least one first magnetic element. The second plurality of magnetic elements can have a plurality of at least one of widths and heights include at least one fourth magnetic element with at least one of a fourth width and fourth height, at least one fifth magnetic element with at least one of a fifth width and fifth height that is a multiple of that of the at least one fourth magnetic element, and at least one sixth magnetic element with at least one of a sixth width and sixth height that is a multiple of that of the at least one fourth magnetic element.

Moreover, the at least one of a first width and first height can be one-third the at least one of the second width and second height, and the at least one of the second width and second height can be one-third the at least one of the third width and third height. The at least one of a fourth width and fourth height may be one-third the at least one of the fifth width and fifth height, and the at least one of the fifth width and fifth height may be one-third the at least one of the sixth width and sixth height. The sixth magnetic element can be arranged opposite two second magnetic elements and three first magnetic element, and the third magnetic element can be arranged opposite two fifth magnetic elements and three fourth magnetic elements.

In other embodiments, the plurality of non-uniformly dimensioned magnetic elements of the first repeatable magnet arrangement may be arranged so that a magnetic flux orientation of a first magnetic element is different from the magnetic flux orientation of magnetic elements adjacent the first magnetic element, and the plurality of non-uniformly dimensioned magnetic elements of the second repeatable magnet arrangement may be arranged so that a magnetic flux orientation of a second magnetic element is different from the magnetic flux orientation of magnetic elements adjacent the second magnetic element.

According to other embodiments, adjacent magnetic elements of the first repeatable magnet arrangement may have magnetic flux orientations offset 45° from each other. Further, adjacent magnetic elements of the second repeatable magnet arrangement may have magnetic flux orientations offset 45° from each other. In the first repeatable magnet arrangement, the magnetic flux orientation of successively arranged magnetic element can rotate counter-clockwise, and in the second repeatable magnet arrangement, the magnetic flux orientation of successively arranged magnetic element can rotate clockwise.

In accordance with further embodiments, a magnet housing can be provided so that the magnetic elements of the first and second repeatable magnet arrangements can be encased in the magnet housing.

Embodiments of the invention are directed to a method for forming a magnet array structure that includes forming a first magnet array including a first repeatable magnet arrangement and forming a second magnet array including a second repeatable magnet arrangement. The first repeatable magnet arrangement includes a plurality of non-uniformly dimensioned magnetic elements and the second repeatable magnet arrangement includes a plurality of non-uniformly dimensioned magnetic elements. The method also includes offsetting the first repeatable magnet arrangement from the second repeatable magnet arrangement to limit attraction forces between the first and second magnet arrays.

According to embodiments, the non-uniformly dimensioned magnetic elements of the first repeatable magnet arrangement can include a first plurality of magnetic elements having a plurality of at least one of widths and heights and a plurality of magnetic flux orientations, and the non-uniformly dimensioned magnetic elements of the second repeatable magnet arrangement can include a second plurality of magnetic elements having a plurality of at least one of widths and heights and a plurality of magnetic flux orientations. The first plurality of magnetic elements may have a plurality of at least one of widths and heights include at least one first magnetic element with at least one of a first width and first height, at least one second magnetic element with at least one of a second width and second height that is a multiple of that of the at least one first magnetic element, and at least one third magnetic element with at least one of a third width and third height that is a multiple of that of the at least one first magnetic element. Further, the second plurality of magnetic elements may have a plurality of at least one of widths and heights include at least one fourth magnetic element with at least one of a fourth width and fourth height, at least one fifth magnetic element with at least one of a fifth width and fifth height that is a multiple of that of the at least one fourth magnetic element, and at least one sixth magnetic element with at least one of a sixth width and sixth height that is a multiple of that of the at least one fourth magnetic element.

Moreover, the at least one of a first width and first height may be one-third the at least one of the second width and second height, and the at least one of the second width and second height may be one-third the at least one of the third width and third height, and the at least one of a fourth width and fourth height may be one-third the at least one of the fifth width and fifth height, and the at least one of the fifth width and fifth height may be one-third the at least one of the sixth width and sixth height. The sixth magnetic element can be arranged opposite two second magnetic elements and three first magnetic elements, and the third magnetic element can be arranged opposite two fifth magnetic elements and three fourth magnetic elements.

In accordance with other embodiments, the plurality of non-uniformly dimensioned magnetic elements of the first repeatable magnet arrangement can be arranged so that a magnetic flux orientation of a first magnetic element is different from the magnetic flux orientation of magnetic elements adjacent the first magnetic element. Further, the plurality of non-uniformly dimensioned magnetic elements of the second repeatable magnet arrangement can be arranged so that a magnetic flux orientation of a second magnetic element is different from the magnetic flux orientation of magnetic elements adjacent the second magnetic element.

According to still other embodiments, adjacent magnetic elements of the first repeatable magnet arrangement may have magnetic flux orientations offset 45° from each other, and adjacent magnetic elements of the second repeatable magnet arrangement may have magnetic flux orientations offset 45° from each other. In the first repeatable magnet arrangement, the magnetic flux orientation of successively arranged magnetic element can rotate counter-clockwise, and in the second repeatable magnet arrangement, the magnetic flux orientation of successively arranged magnetic element can rotate clockwise.

In embodiments, the method can further include arranging the magnetic elements of the first and second repeatable magnet arrangements in a magnet housing.

In accordance with still yet other embodiments of the present invention, the method can also include joining the magnets of the first and second repeatable magnet arrangements together. The method can also include joining the first repeatable magnet arrangements together and joining the second repeatable magnet arrangements together.

Embodiments are directed to a magnet array structure that includes a first linear magnet array including a first magnet arrangement, in which the first magnet arrangement is consecutively repeated and a second linear magnet array including a second magnet arrangement, in which the second magnet arrangement is consecutively repeated. The first magnet arrangement includes a plurality of first magnetic elements having non-uniformly dimensioned widths in a length direction of the first magnet arrangement and the second magnet arrangement includes a plurality of second magnetic elements having non-uniformly dimensioned widths in a length direction of the second magnet arrangement. The first linear magnet array is arranged parallel to the second linear magnet array so that the first magnet arrangement is linearly offset from the second magnet arrangement.

According to embodiments, adjacent first magnetic elements can have magnetic flux orientations offset 45° from each other, and adjacent second magnetic elements can have magnetic flux orientations offset 45° from each other. Further, the magnetic flux orientations across the first magnet arrange rotates counter-clockwise, and the magnetic flux orientations across the second magnet arrangement rotates clockwise.

Embodiments are directed to a method for forming a magnet array structure, which includes forming a first linear magnet array having a first magnet arrangement, in which the first magnet arrangement is consecutively repeated; and forming a second linear magnet array having a second magnet arrangement, in which the second magnet arrangement is consecutively repeated. The first magnet arrangement includes a plurality of first magnetic elements having non-uniformly dimensioned widths in a length direction of the first magnet arrangement, and the second magnet arrangement includes a plurality of second magnetic elements having non-uniformly dimensioned widths in a length direction of the second magnet arrangement. The method further includes arranging the first linear magnet array parallel to the second linear magnet array so that the first magnet arrangement is linearly offset from the second magnet arrangement.

In accordance with still yet other embodiments, the forming of the first magnet arrangement can include arranging the plurality of magnetic elements so that adjacent first magnetic elements have magnetic flux orientations offset 45° from each other, and the forming of the second magnet arrangement can include arranging the plurality of magnetic elements so that adjacent second magnetic elements have magnetic flux orientations offset 45° from each other. Further, the magnetic flux orientations across the first magnet arrange rotates counter-clockwise, and the magnetic flux orientations across the second magnet arrangement rotates clockwise.

Embodiments are directed to a magnet array structure that includes a first linear magnet array having a plurality of consecutively arranged first Halbach arrays and a second linear magnet array having a plurality of consecutively arranged second Halbach arrays. The first linear magnet array, from a first end of the magnet array structure to a second end of the magnet array structure, having magnetic flux orientations rotating in a first direction, and the second linear magnet array, from the first end of the magnet array structure to the second end of the magnet array structure, having magnetic flux orientations rotating in a second direction that is opposite the first direction. The first linear magnet array is arranged parallel to the second linear magnet array so that, between the first and second ends of the magnet array structure, the first Halbach magnetic arrays are linearly offset from the second Halbach magnetic arrays.

According to embodiments, each first Halbach magnetic array can include a plurality of first magnetic elements and each second magnetic Halbach array can include a plurality of second magnetic elements. Further, adjacent first magnetic elements of the plurality of first magnetic elements have magnetic flux orientations offset 45° from each other, and adjacent second magnetic elements of the plurality of second magnetic elements have magnetic flux orientations offset 45° from each other. A width direction for the plurality of first magnetic elements and for the plurality of second magnetic elements extends parallel to a direction from the first end of magnet array structure to the second end of the magnet array structure, and a height direction for the plurality of first magnetic elements and for the plurality of second magnetic elements is normal to the width direction, and the plurality of first magnetic elements and the plurality of second magnetic elements may have a same height.

Moreover, a width direction for the plurality of first magnetic elements and for the plurality of second magnetic elements extends parallel to a direction from the first end of magnet array structure to the second end of the magnet array structure, and the plurality of first magnetic elements may include at least one first magnetic element have a width different from at least one other first magnetic element. The width of the at least one first magnet element may be a multiple of the width of the at least one other first magnet element.

Still further, the plurality of first magnetic elements further may include at least another first magnet element having a width different from the width of the at least one first magnetic element and from the width of the at least one other first magnet element. The width of the at least one first magnet element may be a multiple of the width of the at least one other first magnet element and the width of the at least another first magnetic element may be a multiple of the width of the at least one first magnet element and a multiple of the width of the at least one other first magnet element.

Embodiments are directed to a method for forming a magnet array structure. The method includes forming a first linear magnet array comprising a plurality of consecutively arranged first Halbach arrays and forming a second linear magnet array comprising a plurality of consecutively arranged second Halbach arrays. The first linear magnet array, from a first end of the magnet array structure to a second end of the magnet array structure, having magnetic flux orientations rotating in a first direction, and the second linear magnet array, from the first end of the magnet array structure to the second end of the magnet array structure, having magnetic flux orientations rotating in a second direction that is opposite the first direction. The first linear magnet array is arranged parallel to the second linear magnet array so that, between the first and second ends of the magnet array structure, the first Halbach magnetic arrays are linearly offset from the second Halbach magnetic arrays.

In accordance with still yet other embodiments, each first Halbach magnetic array can include a plurality of first magnetic elements and each second magnetic Halbach array can include a plurality of second magnetic elements, and the forming of each first Halbach magnet array may include arranging the plurality of first magnetic elements so that adjacent first magnetic elements have magnetic flux orientations offset 45° from each other, and the forming of each second Halbach magnet array may include arranging the plurality of second magnetic elements so that adjacent second magnetic elements have magnetic flux orientations offset 45° from each other.

Embodiments are directed to a magnet array structure that includes a first linear magnet array having a first arrangement of magnets, in which the first arrangement of magnets is repeated along a length of the first linear magnet array and a second linear magnet array having a second arrangement of magnets, in which the second arrangement of magnets is repeated along a length of the second linear magnet array. The first arrangement of magnets include individual first magnet elements arranged along the length of the first linear magnet array so that no net magnetic forces parallel to the length of the first linear magnet array result on the first arrangement of magnets and the second arrangement of magnets include individual second magnet elements arranged along the length of the second linear magnet array so that no net magnetic forces parallel to the length of the second linear magnet array result on the second arrangement of magnets. The first arrangement of magnets has a same length along the length of the first linear magnet array as the second arrangement of magnets along the length of the second linear magnet array, and the first linear magnet array is arranged parallel to the second linear magnet array. The first arrangement of magnets along the length of the first linear magnet array is offset from the second arrangement of magnets along the length of the second linear magnet array so that the first arrangement of magnets and the second arrangement of magnets partially overlap.

In embodiments, the individual first magnet elements may be arranged so that adjacent individual first magnetic elements have magnetic flux orientations offset 45° from each other, and the individual second magnet elements may be arranged so that adjacent individual second magnetic elements have magnetic flux orientations offset 45° from each other. The magnetic flux orientations of the individual first magnet elements along the length of the first magnet arrangement in a first direction can have a first rotation and the magnetic flux orientations of the individual second magnet elements along the length of the second magnet arrangement in the first direction can have a second rotation. The first rotation may be opposite the second rotation.

According to embodiments, a first plurality of the individual first magnet elements can have a first width in the length direction of the first linear magnet array and a second plurality of the individual first magnet elements can have a second width in the length direction of the first linear magnet array direction that is different from the first width in the length direction of the first linear magnet array. The first width in the length direction of the first linear magnet array may be a multiple of the second width in the length direction of the first magnet array. Moreover, a first plurality of the individual second magnet elements can have a first width in the length direction of the second linear magnet array and a second plurality of the individual second magnet elements can have a second width in the length direction of the second linear magnet array direction that is different from the first width in the length direction of the second linear magnet array. The first width in the length direction of the first linear magnet array can be greater than the second width in the length direction of the first magnet array, the first width in the length direction of the second linear magnet array can be greater than the second width in the length direction of the second magnet array, and one of the individual first magnet elements having the first width in the length direction of the first linear magnet array can be arranged opposite plural individual second magnet elements having the second widths in the length direction of the second linear magnet array. Further, a third plurality of the individual first magnet elements can have a third width in the length direction of the first linear magnet array direction that is different from the first width in the length direction of the first linear magnet array and from the second width in the length direction of the first linear magnet array. The third width can be a multiple of the first width and of the second width.

Embodiments are directed to a method for forming a magnet array structure. The method includes forming a first linear magnet array comprising a first arrangement of magnets, in which the first arrangement of magnets is repeated along a length of the first linear magnet array, where the first arrangement of magnets comprise individual first magnet elements; forming a second linear magnet array comprising a second arrangement of magnets, in which the second arrangement of magnets is repeated along a length of the second linear magnet array, where the second arrangement of magnets comprise individual second magnet elements; arranging the individual first magnet elements along the length of the first linear magnet array so that no net magnetic forces parallel to the length of the first linear magnet array result on the first arrangement of magnets; and arranging the individual second magnet elements along the length of the second linear magnet array so that no net magnetic forces parallel to the length of the second linear magnet array result on the second arrangement of magnets. The first arrangement of magnets has a same length along the length of the first linear magnet array as the second arrangement of magnets along the length of the second linear magnet array and the first linear magnet array is arranged parallel to the second linear magnet array. The first arrangement of magnets along the length of the first linear magnet array is offset from the second arrangement of magnets along the length of the second linear magnet array so that the first arrangement of magnets and the second arrangement of magnets partially overlap.

According to embodiments, the method can further include arranging the individual first magnet elements so that adjacent individual first magnetic elements have magnetic flux orientations offset 45° from each other; and arranging the individual second magnet elements so that adjacent individual second magnetic elements have magnetic flux orientations offset 45° from each other. The magnetic flux orientations of the individual first magnet elements along the length of the first magnet arrangement in a first direction may have a first rotation and the magnetic flux orientations of the individual second magnet elements along the length of the second magnet arrangement in the first direction may have second rotation. The first rotation can be opposite the second rotation.

In other embodiments, a first plurality of the individual first magnet elements can have a first width in the length direction of the first linear magnet array and a second plurality of the individual first magnet elements can have a second width in the length direction of the first linear magnet array direction that is different from the first width in the length direction of the first linear magnet array. The first width in the length direction of the first linear magnet array may be a multiple of the second width in the length direction of the first magnet array. Moreover, a first plurality of the individual second magnet elements can have a first width in the length direction of the second linear magnet array and a second plurality of the individual second magnet elements have a second width in the length direction of the second linear magnet array direction that is different from the first width in the length direction of the second linear magnet array. The first width in the length direction of the first linear magnet array may be greater than the second width in the length direction of the first magnet array, and the first width in the length direction of the second linear magnet array may be greater than the second width in the length direction of the second magnet array. One of the individual first magnet elements having the first width in the length direction of the first linear magnet array is arranged opposite plural individual second magnet elements having the second widths in the length direction of the second linear magnet array.

In accordance with still yet other embodiments, a third plurality of the individual first magnet elements have a third width in the length direction of the first linear magnet array direction that is different from the first width in the length direction of the first linear magnet array and from the second width in the length direction of the first linear magnet array. The third width can be a multiple of the first width and of the second width.

BRIEF DESCRIPTION OF THE DRAWINGS

These and other features of this disclosure will be best understood by reference to the following detailed description of a preferred embodiment of the invention, taken in conjunction with the accompanying drawings, in which.

DETAILED DESCRIPTION OF THE EMBODIMENTS OF THE DISCLOSURE

Figure 1:
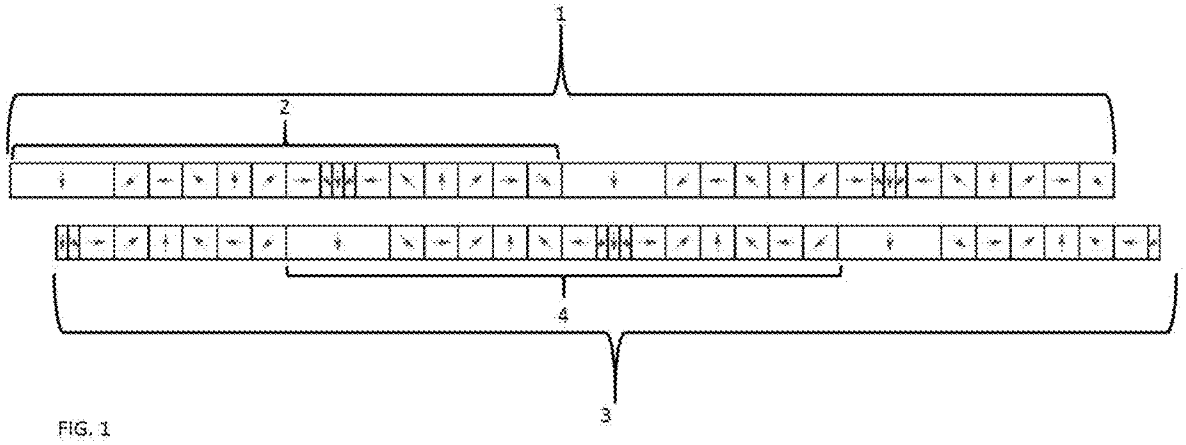
FIG. 1 shows an exemplary magnet array structure comprising a first magnet array and a second magnet array in accordance with aspects of the disclosure.

In the following description, the various embodiments of the present disclosure will be described with respect to the enclosed drawings. As required, detailed embodiments of the embodiments of the present disclosure are discussed herein; however, it is to be understood that the disclosed embodiments are merely exemplary of the embodiments of the disclosure that may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, such that the description, taken with the drawings, making apparent to those skilled in the art how the forms of the present disclosure may be embodied in practice.

As used herein, the singular forms "a," "an," and "the" include the plural reference unless the context clearly dictates otherwise. For example, reference to "a magnetic material" would also mean that mixtures of one or more magnetic materials can be present unless specifically excluded.

Except where otherwise indicated, all numbers expressing quantities used in the specification and claims are to be understood as being modified in all instances by the term "about." Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the indefinite article "a" indicates one as well as more than one and does not necessarily limit its referent noun to the singular.

As used herein, the terms "about" and "approximately" indicate that the amount or value in question may be the specific value designated or some other value in its neighborhood. Generally, the terms "about" and "approximately denoting a certain value is intended to denote a range within ±5% of the value. As one example, the phrase "about 100" denotes a range of 100±5, i.e., the range from 95 to 105. Generally, when the terms "about" and "approximately are used, it can be expected that similar results or effects according to the disclosure can be obtained within a range of ±5% of the indicated value.

As used herein, the term "and/or" indicates that either all or only one of the elements of said group may be present. For example, "A and/or B" shall mean "only A, or only B, or both A and B". In the case of "only A", the term also covers the possibility that B is absent, i.e., "only A, but not B".

The term "substantially parallel" refers to deviating less than 20° from parallel alignment and the term "substantially perpendicular" refers to deviating less than 20° from perpendicular alignment. The term "parallel" refers to deviating less than 5° from mathematically exact parallel alignment. Similarly, "perpendicular" refers to deviating less than 5° from mathematically exact perpendicular alignment.

The term "at least partially" is intended to denote that the following property is fulfilled to a certain extent or completely.

The terms "substantially" and "essentially" are used to denote that the following feature, property or parameter is either completely (entirely) realized or satisfied or to a major degree that does not adversely affect the intended result.

The term "comprising" as used herein is intended to be non-exclusive and open-ended. Thus, for instance a coating composition comprising a compound A may include other compounds besides A. However, the term "comprising" also covers the more restrictive meanings of "consisting essentially of" and "consisting of", so that for instance "a coating composition comprising a compound A" may also (essentially) consist of the compound A.

The various embodiments disclosed herein can be used separately and in various combinations unless specifically stated to the contrary.

FIG. 1 shows an exemplary magnet array structure (MAS) that includes a plurality of magnet arrays in accordance with aspects of the disclosure. The plurality of magnet arrays can include a first magnet array 1 and a second magnet array 3. As shown in FIG. 1, first magnet array 1 may include a first repeatable magnet arrangement 2, and the second magnet array 3 comprises a second repeatable magnet arrangement 4. First and second repeatable magnet arrangements 2 and 4 are shown here configured as a modified Halbach array.

Figure 2:
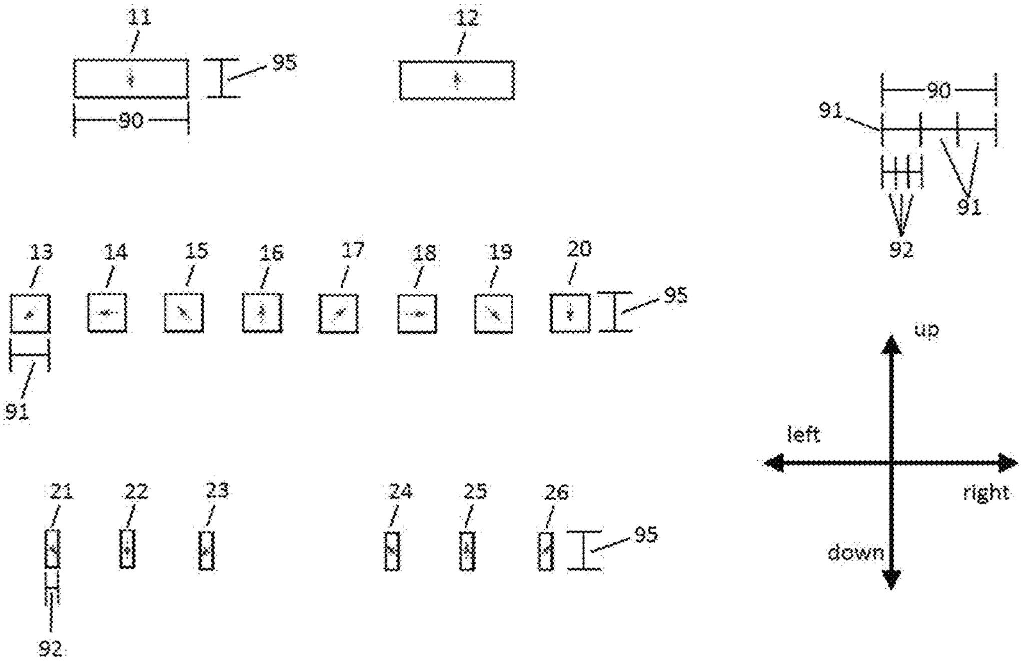
FIG. 2 show a plurality of magnetic elements comprising a width, height, and magnetic flux direction in accordance with aspects of the disclosure.

FIG. 2 shows a plurality of magnetic elements, which can be configured in repeatable magnet arrangements in accordance with aspects of the disclosure. Each magnetic element configuration (MEC) in the repeatable magnet arrangements is a customized magnet, characterized by certain dimensions and remnant magnetization strength. An arrow shown in each MEC depicts the direction of magnetic flux (or magnetization direction). For example, a first MEC 11 has an arrow pointing downwards (along the page), indicating a downwardly-directed magnetic flux.

The plurality of magnetic elements in FIG. 2 includes first MEC 11 and a second MEC 12. First MEC 11 has a first width 90 and a first height 95 and second MEC 12 has a width equal to (or approximately equal to) first width 90 and a height equal to (or approximately equal to) the first height 95. However, while first MEC 11 has a downwardly-directed magnetic flux, second MEC 12 has an upwardly-directed magnetic flux.

The plurality of magnetic elements further includes a third MEC 13, a fourth MEC 14, a fifth MEC 15, a sixth MEC 16, a seventh MEC 17, an eighth MEC 18, a ninth MEC 19, and a tenth MEC 20, each of which have a width equal to (or approximately equal to) a second width 91 and a height equal to (or approximately equal to) the first height 95. In the illustrated arrangement of the plurality of magnetic elements, third MEC 13 has a left and downwardly-directed magnetic flux; fourth MEC 14 has a leftwardly-directed magnetic flux; fifth MEC 15 has a left and upwardly-directed magnetic flux; sixth MEC 16 has an upwardly-directed magnetic flux; seventh MEC 17 has a right and upwardly-directed magnetic flux; eighth MEC 18 has a rightwardly-directed magnetic flux; ninth MEC 19 has a right and downwardly-directed magnetic flux; and tenth MEC 20 has a downwardly-directed magnetic flux.

Additionally, the plurality of magnetic elements can include an eleventh MEC 21, a twelfth MEC 22, a thirteenth MEC 23, a fourteenth MEC 24, a fifteenth MEC 25, and a sixteenth MEC 26, each of which have a width equal to (or approximately equal to) a third width 92 and a height equal to (or approximately equal to) the first height 95. In the illustrated arrangement of the plurality of magnetic elements, eleventh MEC 21 has a right and downwardly-directed magnetic flux; twelfth MEC 22 has a downwardly-directed magnetic flux; thirteenth MEC 23 has a left and downwardly-directed magnetic flux; fourteenth MEC 24 has a left and upwardly-directed magnetic flux; fifteenth MEC 25 has an upwardly-directed magnetic flux; and sixteenth MEC 26 has a right and upwardly-directed magnetic flux.

As is apparent from FIG. 2, while each MEC in this exemplary embodiment has a same or approximately same height 95, first width 90 (of MECs 11, 12) is approximately three times as long as second width 91 (of MECs 13-20), which is approximately three times as long as third width 92 (MECs 21-26). It should be understood that the varying widths are exemplary, in that the first, second, and third widths 90, 91, 92 demonstrate that the plurality of magnetic elements can comprise MECs with varying widths and magnetic fluxes in order to achieve desired magnetic field strengths. Further, the individual MECs can be arranged adjacent each other via adhesive bonding or gluing and/or coupled together via arrangement in a housing or mechanically coupled via connectors.

In embodiments, not all MECs depicted in FIG. 2 are used to create the MAS. Additionally, alternative magnetic arrays can be created by modifying embodiments of this disclosure to include additional MECs.

Figure 3:
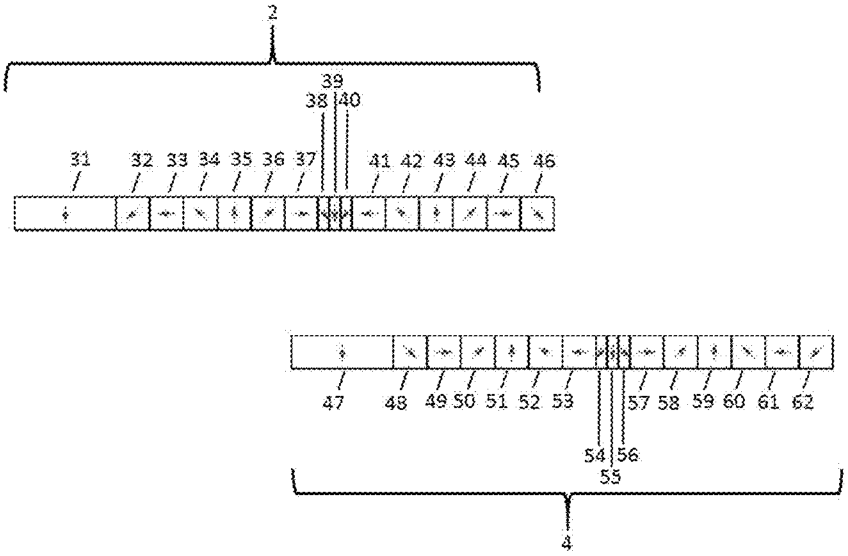
FIG. 3 shows a first repeatable magnet arrangement of the first magnet array and a second repeatable magnet arrangement of the second magnet array in accordance with aspects of the disclosure.

FIG. 3 shows first repeatable magnet arrangement 2 and second repeatable magnet arrangement 4 in accordance with aspects of the disclosure. In this exemplary embodiment, first repeatable magnet arrangement 2 includes a first plurality of magnetic elements, such as a first MEC 31, a second MEC 32, a third MEC 33, a fourth MEC 34, a fifth MEC 35, a sixth MEC 36, a seventh MEC 37, an eighth MEC 38, a ninth MEC 39, a tenth MEC 40, an eleventh MEC 41, a twelfth MEC 42, a thirteenth MEC 43, a fourteenth MEC 44, a fifteenth MEC 45, and a sixteenth MEC 46. By way of non-limiting example, it is noted that, starting from MEC 31, the magnetic flux of which is pointing downward, the magnetic flux of each successive MEC (moving to the right) is offset 45° from its adjacent MECs, such that the magnetic flux "rotates" counter-clockwise, consistent with an "M8 Halbach" magnetic array.

Second repeatable magnet arrangement 2 in this exemplary embodiment includes a second plurality of magnetic elements, such as a seventeenth MEC 47, an eighteenth MEC 48, a nineteenth MEC 49, a twentieth MEC 50, a twenty-first MEC 51, a twenty-second MEC 52, a twenty-third MEC 53, a twenty-fourth MEC 54, a twenty-fifth MEC 55, a twenty-sixth MEC 56, a twenty-seventh MEC 57, a twenty-eighth MEC 58, a twenty-ninth MEC 59, a thirtieth MEC 60, a thirty-first MEC 61, and a thirty-second MEC 62. By way of non-limiting example, it is noted that, starting from MEC 47, the magnetic flux of which is pointing downward, the magnetic flux of each successive MEC (moving to the right) is offset 45° from its adjacent MECs, such that the magnetic flux "rotates" clockwise, consistent with an "M8 Halbach" magnetic array.

In the exemplary embodiment of FIG. 3, first and seventeenth MECs 31, 47 generally correspond to the first MEC 11 depicted in FIG. 2; second and thirty-second MECs 32, 62 generally correspond to third MEC 13 in FIG. 2; third, eleventh, twenty-third, and thirty-first MECs 33, 41, 53, 61 generally correspond to fourth MEC 14 in FIG. 2; fourth, twelfth, twenty-second, and thirtieth MECs 34, 42, 52, 60 generally correspond to fifth MEC 15 in FIG. 2; fifth, thirteenth, twenty-first, and twenty-ninth MECs 35, 43, 51, 59 generally correspond to sixth MEC 16 in FIG. 2; sixth, fourteenth, twentieth, and twenty-eighth MECs 36, 44, 50, 58 generally correspond to seventh MEC 17 in FIG. 2; seventh, fifteenth, nineteenth, and twenty-seventh MECs 37, 45, 49, 57 generally correspond to eighth MEC 18 in FIG. 2; eighth and twenty-sixth MECs 38, 56 generally correspond to eleventh MEC 21 in FIG. 2; ninth and twenty-fifth MECs 39, 55 generally correspond to twelfth MEC 22 in FIG. 2; tenth and twenty-fourth MECs 40, 54 generally correspond to thirteenth MEC 23 in FIG. 2; and sixteenth and eighteenth MEC 46, 48 generally correspond to ninth MEC 19 in FIG. 2.

FIG. 3 further shows that first repeatable magnet arrangement 2 and the second repeatable magnet arrangement 4 have similar magnetic element configurations. However, to mitigate attractive forces between first magnet array 1 and second magnet array 3, second repeatable magnet arrangement 4 can be longitudinally offset from first repeatable magnet arrangement 2. In the exemplary embodiment, MEC 47 of second repeatable magnet arrangement 4 can be arranged opposite MECs 37-41 of first repeatable magnet arrangement 3.

Figure 4:
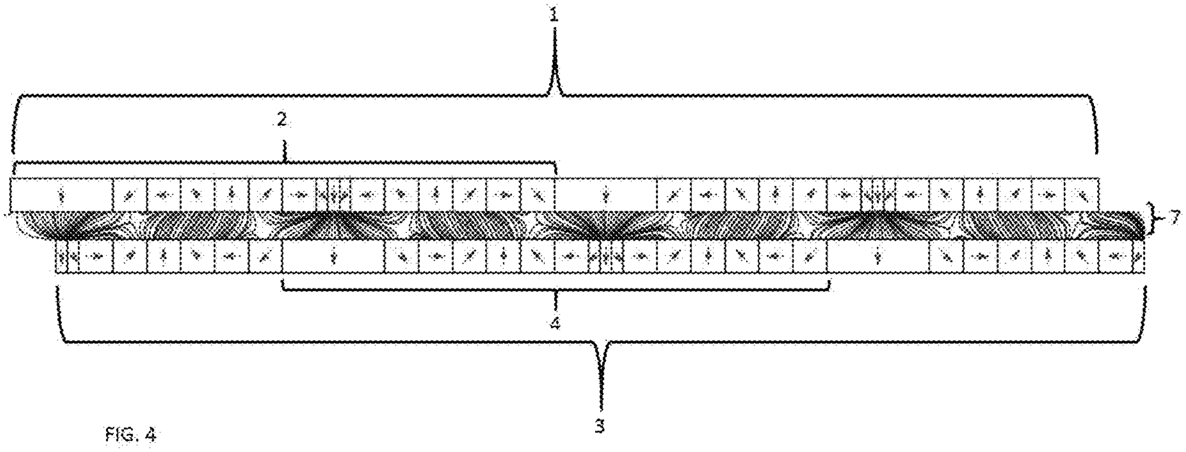
FIG. 4 shows a magnetic field created by the magnet array structure in accordance with aspects of the disclosure.

FIG. 4 shows first and second magnet arrays 1, 3 of the MAS. Moreover, a magnetic field 7 generated between the magnetic elements of the longitudinally offset first and second repeatable magnet arrangements 2, 4 of first and second magnet arrays 1, 3 is depicted.

Figure 5:
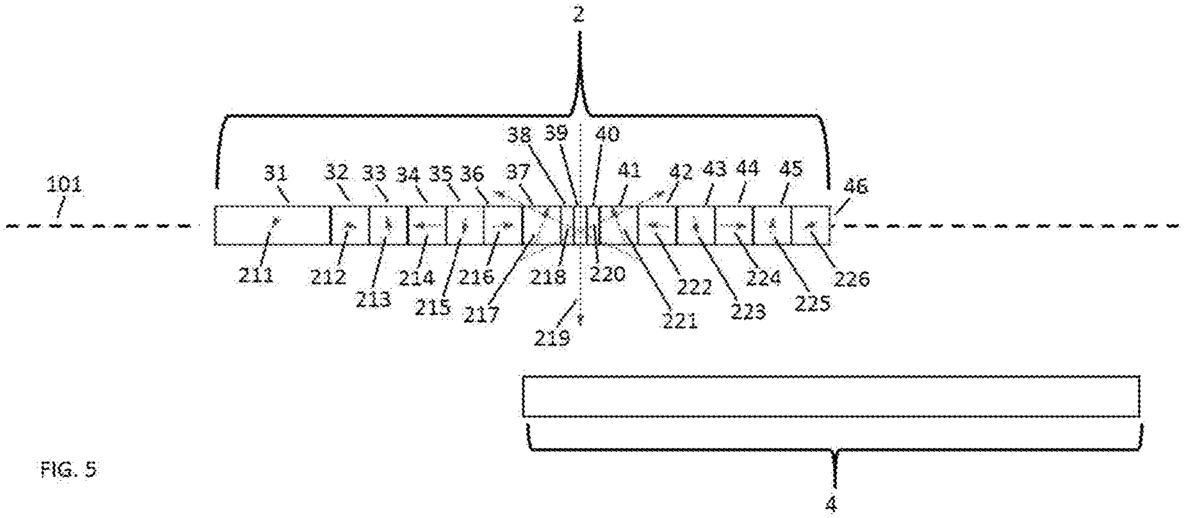
FIG. 5 shows local magnetic forces (vectors) applied to the first repeatable magnet arrangement in accordance with aspects of the disclosure.

FIG. 5 shows a free-body diagram of the magnetic elements of first repeatable magnetic arrangement 2 in accordance with aspects of the disclosure. Second repeatable magnetic arrangement 4, the constituent magnetic elements of which are not shown in FIG. 5, is shown in its location offset, as in FIG. 3, from first repeatable magnetic arrangement 2. A direction of resulting magnetic forces acting on the magnetic elements of first repeatable magnet arrangement 2 is depicted in each magnetic element. This resulting magnetic force acting on the magnetic elements results from the offset arrangement of the first and second repeatable magnet arrangements 2, 3. A reference line 101 runs through and parallel to first repeatable magnet arrangement 2.

A magnetic force acts on each magnetic element of first repeatable magnet arrangement 2. This magnetic force results from the proximately arranged magnetic elements within first repeatable magnet arrangement 2 and from the proximately arranged magnetic elements within oppositely arranged and offset second repeatable magnet arrangement 4. Thus, it is understood that each magnetic force comprises a first force component in a direction parallel to reference line 101 and a second force component in a direction perpendicular to reference line 101.

A first magnetic force 211 is applied to first MEC 31; a second magnetic force 212 is applied to second MEC 32; a third magnetic force 213 is applied to third MEC 33; a fourth magnetic force 214 is applied to fourth MEC 34; a fifth magnetic force 215 is applied to fifth MEC 35; a sixth magnetic force 216 is applied to sixth MEC 36; a seventh magnetic force 217 is applied to seventh MEC 37; an eighth magnetic force 218 is applied to eighth MEC 38; a ninth magnetic force 219 is applied to ninth MEC 39; a tenth magnetic force 220 is applied to tenth MEC 40; an eleventh magnetic force 221 is applied to eleventh MEC 41; a twelfth magnetic force 222 is applied to twelfth MEC 42; a thirteenth magnetic force 223 is applied to thirteenth MEC 43; a fourteenth magnetic force 224 is applied to fourteenth MEC 44; a fifteenth magnetic force 225 is applied to fifteenth MEC 45; a sixteenth magnetic force 226 is applied to sixteenth MEC 46.

For the force components parallel to reference line 101, second magnetic force 212 cancels sixteenth magnetic force 226, third magnetic force 213 cancels fifteenth magnetic force 225, fourth magnetic force 214 cancels fourteenth magnetic force 224, fifth magnetic force 215 cancels thirteenth magnetic force 223, sixth magnetic force 216 cancels twelfth magnetic force 222, seventh magnetic force 217 cancels eleventh magnetic force 221, and eighth magnetic force 218 cancels tenth magnetic force 220. Further, in the direction parallel to reference line 101, first and ninth magnetic forces 211, 219 are negligible. The result is no net magnetic forces on magnetic arrangement 2 parallel to reference line 101, as they are locally canceled out.

For the force components perpendicular to reference line 101, the first, second, fourth, sixth, twelfth, fourteenth, and sixteenth magnetic forces 211, 212, 214, 216, 222, 224, 226 are negligible. Further, for the force components perpendicular to reference line 101, third and fifteenth magnetic force 213, 225 oppose the fifth and thirteenth magnetic forces 215, 223, and the seventh, eighth, tenth, and eleventh magnetic forces 217, 218, 220, 221 oppose the ninth magnetic force 219. The result is no net magnetic forces on magnetic arrangement 2 parallel to reference line 101, as they are locally canceled out.

In embodiments, the magnetic elements in first repeatable magnet arrangement 2 and second repeatable magnet arrangement 4 are formed together and are encased within a fixed magnet housing structure, such as an electric motor or custom designed rigid part. As shown in FIG. 5, a large magnetic force (the ninth magnetic force 219) is focused within ninth magnetic element 39. The seventh, eighth, tenth, and eleventh magnetic forces 217, 218, 220, 221 are arranged to oppose the ninth magnetic force 219, which transfers an overall force applied to first repeatable magnet into multiple opposing shear forces that are applied to the first plurality of magnetic elements. Any residual magnetic force that is not locally cancelled out can be countered by the fixed magnet housing.

Because first repeatable magnet arrangement 2 can be repeated within first magnet array 1 and second repeatable magnet arrangement 4 can be repeated within second magnet array 2—and because first magnet array 1 and second magnet array 2 have a fixed orientation—the magnetic field 7 described in FIG. 4 and the plurality of magnetic forces demonstrated in FIG. 5 repeat throughout first magnet array 1. Deviations in magnetic field 7 and the plurality of magnetic forces can arise due to irregularities in magnetic elements—such as width and strength—and due to being near the beginning or end of the MAS.

Further, since first repeatable magnet arrangement 2 and second repeatable magnet arrangement 4 are similar, the magnitude of magnetic forces applied to second repeatable magnet arrangement 4 will be similar to the magnitude of magnetic forces applied to first repeatable magnet arrangement 2. However, because the second plurality of magnetic elements in second repeatable magnet arrangement 4 have different orientations than the magnetic elements in first repeatable magnet arrangement 2, the direction of magnetic forces applied to the second repeatable magnet arrangement 4 may differ.

Despite the differing orientations of the magnetic forces applied to second repeatable magnet arrangement 4, these magnetic forces will cancel out locally (similarly to the magnetic forces applied to first repeatable magnet arrangement 2).

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the disclosure has been described with reference to specific embodiments, those skilled in the art will understand that various changes may be made and equivalents may be substituted for elements thereof without departing from the true spirit and scope of the disclosure. While exemplary embodiments are described above, it is not intended that these embodiments describe all possible forms of the embodiments of the disclosure. Rather, the words used in the specification are words of description rather than limitation, and it is understood that various changes may be made without departing from the spirit and scope of the disclosure. In addition, modifications may be made without departing from the essential teachings of the disclosure. Furthermore, the features of various implementing embodiments may be combined to form further embodiments of the disclosure.

While the specification describes particular embodiments of the present invention, those of ordinary skill can devise variations of the present invention without departing from the inventive concept.

Insofar as the description above and the accompanying drawing disclose any additional subject matter that is not within the scope of the claims below, the embodiments are not dedicated to the public and the right to file one or more applications to claim such additional embodiments is reserved.

What is claimed:

1. A magnet array structure, comprising:

a first linear magnet array comprising a first arrangement of magnets, in which the first arrangement of magnets is repeated along a length of the first linear magnet array; and a second linear magnet array comprising a second arrangement of magnets, in which the second arrangement of magnets is repeated along a length of the second linear magnet array;

the first arrangement of magnets comprising individual first magnet elements arranged along the length of the first linear magnet array so that no net magnetic forces parallel to the length of the first linear magnet array result on the first arrangement of magnets;

the second arrangement of magnets comprising individual second magnet elements arranged along the length of the second linear magnet array so that no net magnetic forces parallel to the length of the second linear magnet array result on the second arrangement of magnets;

wherein the first arrangement of magnets has a same length along the length of the first linear magnet array as the second arrangement of magnets along the length of the second linear magnet array, wherein the first linear magnet array is arranged parallel to the second linear magnet array, and wherein the first arrangement of magnets along the length of the first linear magnet array is offset from the second arrangement of magnets along the length of the second linear magnet array so that the first arrangement of magnets and the second arrangement of magnets partially overlap.

2. The magnet array structure according to claim 1, wherein the individual first magnet elements are arranged so that adjacent individual first magnetic elements have magnetic flux orientations offset 45° from each other, and wherein the individual second magnet elements are arranged so that adjacent individual second magnetic elements have magnetic flux orientations offset 45° from each other.

3. The magnet array structure according to claim 2, wherein the magnetic flux orientations of the individual first magnet elements along the length of the first magnet arrangement in a first direction have a first rotation; and wherein the magnetic flux orientations of the individual second magnet elements along the length of the second magnet arrangement in the first direction have a second rotation.

4. The magnet array structure according to claim 3, wherein the first rotation is opposite the second rotation.

5. The magnet array structure according to claim 1, wherein a first plurality of the individual first magnet elements have a first width in the length direction of the first linear magnet array and a second plurality of the individual first magnet elements have a second width in the length direction of the first linear magnet array direction that is different from the first width in the length direction of the first linear magnet array.

6. The magnet array structure according to claim 5, wherein the first width in the length direction of the first linear magnet array is a multiple of the second width in the length direction of the first magnet array.

7. The magnet array structure according to claim 5, wherein a first plurality of the individual second magnet elements have a first width in the length direction of the second linear magnet array and a second plurality of the individual second magnet elements have a second width in the length direction of the second linear magnet array direction that is different from the first width in the length direction of the second linear magnet array.

8. The magnet array structure according to claim 7, wherein the first width in the length direction of the first linear magnet array is greater than the second width in the length direction of the first magnet array, wherein the first width in the length direction of the second linear magnet array is greater than the second width in the length direction of the second magnet array, and wherein one of the individual first magnet elements having the first width in the length direction of the first linear magnet array is arranged opposite plural individual second magnet elements having the second widths in the length direction of the second linear magnet array.

9. The magnet array structure according to claim 5, a third plurality of the individual first magnet elements have a third width in the length direction of the first linear magnet array direction that is different from the first width in the length direction of the first linear magnet array and from the second width in the length direction of the first linear magnet array.

10. The magnet array structure according to claim 9, wherein the third width is a multiple of the first width and of the second width.

11. A method for forming a magnet array structure, comprising:

forming a first linear magnet array comprising a first arrangement of magnets, in which the first arrangement of magnets is repeated along a length of the first linear magnet array, wherein the first arrangement of magnets comprise individual first magnet elements; and forming a second linear magnet array comprising a second arrangement of magnets, in which the second arrangement of magnets is repeated along a length of the second linear magnet array, wherein the second arrangement of magnets comprise individual second magnet elements arranging the individual first magnet elements along the length of the first linear magnet array so that no net magnetic forces parallel to the length of the first linear magnet array result on the first arrangement of magnets;

arranging the individual second magnet elements along the length of the second linear magnet array so that no net magnetic forces parallel to the length of the second linear magnet array result on the second arrangement of magnets;

wherein the first arrangement of magnets has a same length along the length of the first linear magnet array as the second arrangement of magnets along the length of the second linear magnet array, wherein the first linear magnet array is arranged parallel to the second linear magnet array, and wherein the first arrangement of magnets along the length of the first linear magnet array is offset from the second arrangement of magnets along the length of the second linear magnet array so that the first arrangement of magnets and the second arrangement of magnets partially overlap.

12. The method according to claim 11, further comprising arranging the individual first magnet elements so that adjacent individual first magnetic elements have magnetic flux orientations offset 45° from each other; and arranging the individual second magnet elements so that adjacent individual second magnetic elements have magnetic flux orientations offset 45° from each other.

13. The method according to claim 12, wherein the magnetic flux orientations of the individual first magnet elements along the length of the first magnet arrangement in a first direction have a first rotation; and wherein the magnetic flux orientations of the individual second magnet elements along the length of the second magnet arrangement in the first direction have a second rotation.

14. The method according to claim 13, wherein the first rotation is opposite the second rotation.

15. The method according to claim 11, wherein a first plurality of the individual first magnet elements have a first width in the length direction of the first linear magnet array and a second plurality of the individual first magnet elements have a second width in the length direction of the first linear magnet array direction that is different from the first width in the length direction of the first linear magnet array.

16. The method according to claim 15, wherein the first width in the length direction of the first linear magnet array is a multiple of the second width in the length direction of the first magnet array.

17. The method according to claim 15, wherein a first plurality of the individual second magnet elements have a first width in the length direction of the second linear magnet array and a second plurality of the individual second magnet elements have a second width in the length direction of the second linear magnet array direction that is different from the first width in the length direction of the second linear magnet array.

18. The method according to claim 17, wherein the first width in the length direction of the first linear magnet array is greater than the second width in the length direction of the first magnet array, wherein the first width in the length direction of the second linear magnet array is greater than the second width in the length direction of the second magnet array, and wherein one of the individual first magnet elements having the first width in the length direction of the first linear magnet array is arranged opposite plural individual second magnet elements having the second widths in the length direction of the second linear magnet array.

19. The method according to claim 15, a third plurality of the individual first magnet elements have a third width in the length direction of the first linear magnet array direction that is different from the first width in the length direction of the first linear magnet array and from the second width in the length direction of the first linear magnet array.

20. The method according to claim 19, wherein the third width is a multiple of the first width and of the second width.

* * * * *